United States Patent
Toney, Jr.

(10) Patent No.: US 9,615,120 B2
(45) Date of Patent: Apr. 4, 2017

(54) SYSTEMS AND METHODS FOR ASSOCIATING ADDITIONAL CONTENT WITH BROADBAND CONTENT

(75) Inventor: Roy Roger Toney, Jr., Marietta, GA (US)

(73) Assignee: Cox Communication, Inc., Atlanta, GA (US)

( * ) Notice: Subject to any disclaimer, the term of this patent is extended or adjusted under 35 U.S.C. 154(b) by 51 days.

(21) Appl. No.: 13/315,716

(22) Filed: Dec. 9, 2011

(65) Prior Publication Data

US 2013/0152147 A1 Jun. 13, 2013

(51) Int. Cl.
*H04N 7/173* (2011.01)
*H04N 21/414* (2011.01)
*H04N 21/4722* (2011.01)

(52) U.S. Cl.
CPC ... *H04N 21/41407* (2013.01); *H04N 21/4722* (2013.01)

(58) Field of Classification Search
CPC .......... H04N 21/262; H04N 21/26216; H04N 21/26233; H04N 21/43; H04N 21/4345; H04N 21/4722
USPC ............. 725/80, 133, 141, 153, 110
See application file for complete search history.

(56) References Cited

U.S. PATENT DOCUMENTS

| | | | |
|---|---|---|---|
| 6,081,830 A * | 6/2000 | Schindler | 709/204 |
| 6,097,441 A * | 8/2000 | Allport | 348/552 |
| 6,249,914 B1 * | 6/2001 | Harrison et al. | 725/141 |
| 6,349,410 B1 * | 2/2002 | Lortz | 725/110 |
| 6,799,327 B1 * | 9/2004 | Reynolds et al. | 725/42 |
| 6,832,388 B1 * | 12/2004 | Du Val | 725/110 |
| 7,712,125 B2 * | 5/2010 | Herigstad et al. | 725/141 |
| 8,555,330 B2 * | 10/2013 | Chang | H04N 7/162 725/133 |
| 8,627,438 B1 * | 1/2014 | Bhimanaik | H04L 63/10 726/9 |
| 2001/0018771 A1 * | 8/2001 | Walker et al. | 725/91 |
| 2002/0147984 A1 * | 10/2002 | Tomsen et al. | 725/109 |
| 2009/0183221 A1 * | 7/2009 | Klein et al. | 725/131 |
| 2012/0144418 A1 * | 6/2012 | Morris | H04N 21/4126 725/32 |
| 2012/0151525 A1 * | 6/2012 | Demchenko | H04N 21/482 725/39 |

* cited by examiner

*Primary Examiner* — Farzana Hossain

(74) *Attorney, Agent, or Firm* — Eversheds Sutherland (US) LLP

(57) ABSTRACT

Systems and methods for associating additional content with broadband content are provided. A pairing between a customer premise device configured to output broadband content and a customer device may be identified by a service provider system. Information associated with content output by the customer premise device may be received by the service provider system from the customer premise device. Based at least in part upon an evaluation of the received information, the service provider system may identify additional content to be communicated to the customer device. The service provider system may then facilitate communication of the additional content to the customer device.

16 Claims, 5 Drawing Sheets

SYSTEMS AND METHODS FOR ASSOCIATING ADDITIONAL CONTENT WITH BROADBAND CONTENT

TECHNICAL FIELD

Aspects of the disclosure relate generally to the delivery of content, and more particularly, to the delivery of additional content associated with delivered broadband content.

BACKGROUND

A wide variety of service providers, such as cable providers and satellite providers, provide broadband communications services, such as television services, to customers. In a typical distribution of content, a service provider outputs broadband content that is received and processed by a customer premise device, such as a cable set-top box or a satellite set-top box. In this regard, a wide variety of broadband information, such as television programming, video on-demand programming, and pay-per-view programming, is output to customers. With the introduction of additional types of devices that may be configured to receive content, such as tablet computers and mobile devices, opportunities are available for providing additional content to customers. For example, opportunities exist for providing additional content associated with broadband content output by a customer premise device.

BRIEF DESCRIPTION

Some or all of the above needs and/or problems may be addressed by certain embodiments of the invention. Embodiments of the disclosure may include systems and methods for associating additional content with broadband content. In one embodiment, a method for associating additional content with broadband content may be provided. A pairing between a customer premise device configured to output broadband content and a customer device may be identified by a service provider system. The service provider system may include one or more computers. Information associated with content output by the customer premise device may be received by the service provider system from the customer premise device. Based at least in part upon an evaluation of the received information, the service provider system may identify additional content to be communicated to the customer device. The service provider system may then facilitate communication of the additional content to the customer device.

In accordance with another embodiment, a system for associating additional content with broadband content may be provided. The system may include at least one memory and at least one processor. The at least one memory may be configured to store computer-executable instructions. The at least one processor may be configured to access the at least one memory and execute the computer-executable instructions to: identify a pairing between a customer premise device configured to output broadband content and a customer device; receive, from the customer premise device, information associated with content output by the customer premise device; identify, based at least in part upon an evaluation of the received information, additional content to be communicated to the customer device; and facilitate communication of the additional content to the customer device.

In accordance with yet another embodiment, one or more computer-readable media may be provided that are configured to receive and output additional content associated with broadband content. The computer-readable media may include computer-executable instructions that, when executed by at least one processor associated with a customer device, configure the at least one processor to: collect identifying information associated with an external customer premise device configured to output broadband content; communicate the collected information to a service provider in order to facilitate identification of a paired connection between the customer premise device and the customer device; receive additional content associated with content output by the customer premise device; and output at least a portion of the additional content for presentation.

Additional systems, methods, apparatus, features, and aspects may be realized through the techniques of various embodiments of the disclosure. Other embodiments and aspects of the disclosure are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
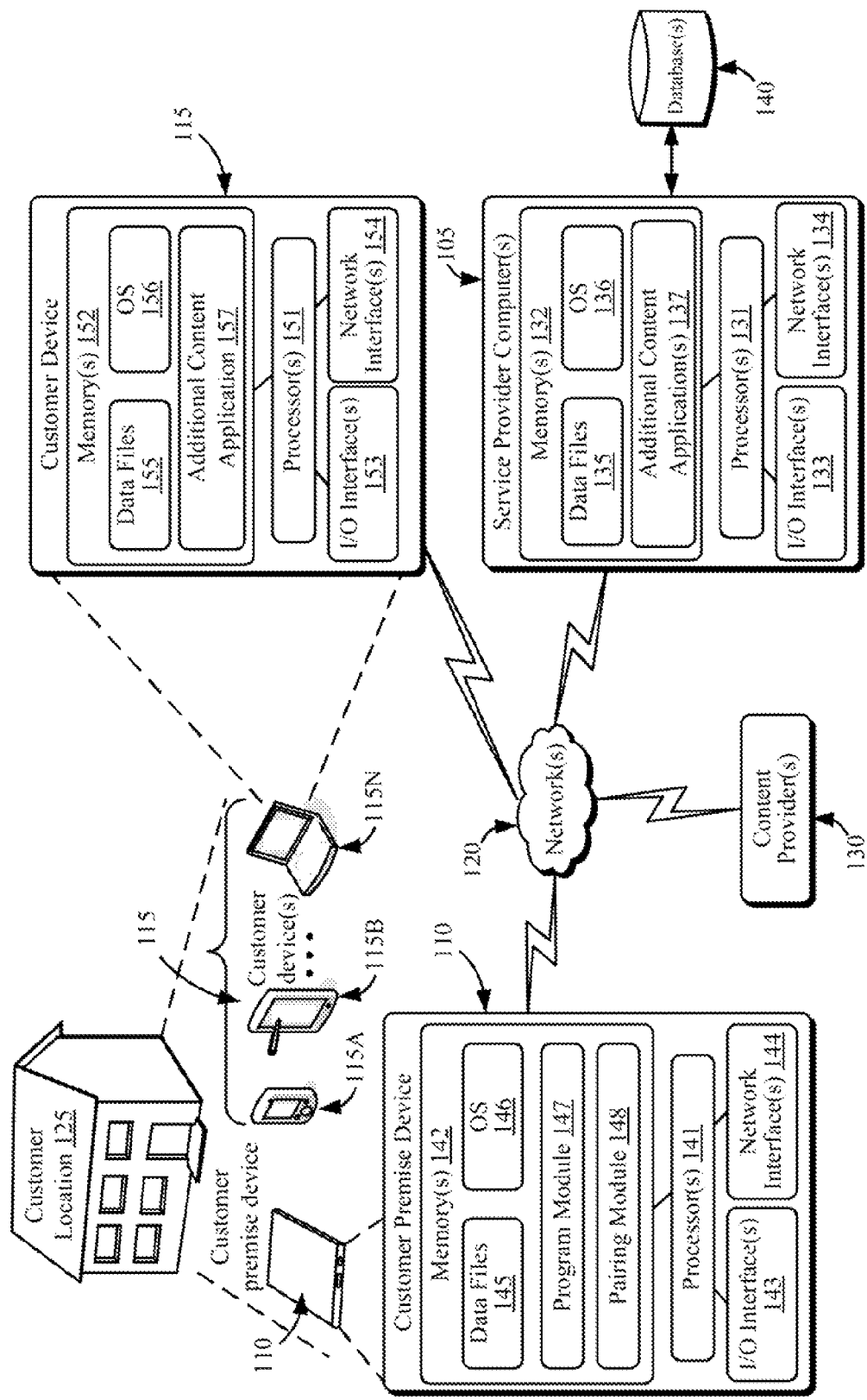
FIG. 1 illustrates a block diagram of an example system that may be utilized to facilitate the delivery of additional content in association with broadband content, according to an illustrative embodiment of the disclosure.

Embodiments of the disclosure now will be described more fully hereinafter with reference to the accompanying drawings, in which embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the disclosure may include systems, methods, and apparatus for associating additional content with broadband content and providing the additional content to customer devices. In certain embodiments, a customer premise device, such as a set-top box, an embedded set-top box, or a virtual set-top box, may be configured to receive, process, and output broadband content output by a service provider. The customer premise device may be associated with a customer of the service provider and/or with a suitable customer account. The customer (or one of several customers associated with the customer account) may additionally be associated with any number of customer devices, such as a mobile device, a tablet computer, or a personal computer. The service provider may identify a pairing between the customer premise device and a customer device. Based at least in part upon the determined pairing, the service provider may facilitate the provision of additional content to the customer device. In certain embodiments, the additional content may be associated with the broadband content output by the customer premise device. For example, during the output of a particular television program, additional content associated with the television program may be provided to the customer device.

A wide variety of suitable methods and/or techniques may be utilized as desired to identify a pairing between a customer premise device and a customer device. For example, identifying information associated with a customer device (e.g., a device identifier, a telephone number, a network address, etc.) may be received from a customer premise device. In this regard, both the customer device and the customer premise device, as well as a pairing or association of the devices, may be identified by the service provider. As another example, identifying information associated with a customer premise device (e.g., a device identifier, etc.) may be received from a customer device, and a pairing or association may be identified or determined based at least in part upon the received identifying information. As yet another example, the service provider may communicate a code or other identifier to a device for output, and the receipt of the code from another device may be utilized to identify a pairing. For example, a code may be communicated to a customer premise device for output to a customer. The code may then either be entered into the customer device by the customer or received by the customer device via one or more suitable communications between the customer device and the customer premise device. The code may then be communicated by the customer device to the service provider and evaluated by the service provider in order to identify a pairing.

Once a pairing has been identified, the service provider may receive information associated with the broadband content being output by the customer premise device. For example, the customer premise device may communicate a message including a wide variety of different types of information associated with output content, such as an identifier of the customer premise device, a channel identifier, a program identifier, and/or timing information associated with the content (e.g., timing delay information, a timing offset, a point in time within a program or other content, etc.). As desired, information may be periodically pushed from the customer premise device to the service provider. For example, a periodic programming message or annunciation message may be communicated. Alternatively, information may be communicated to the service provider in response to a received request.

Based at least in part upon the received information associated with the output content, the service provider may identify a current location within the broadband content being output by the customer premise device. For example, the service provider may identify a current location or point in time within an output television program, movie, video on-demand program, or pay-per-view program. In this regard, the service provider may identify or determine a current output of the customer premise device. The service provider may then identify additional content (and/or a source of additional content) associated with the content output by the customer premise device. For example, the service provider may identify supplemental content associated with the output broadband content. A wide variety of different types of additional content may be identified as desired in various embodiments, such as advertising information, coupons and/or offers, statistical information, detailed explanatory information, rating information, survey information, and/or other types of supplemental content. For example, if a sports program is output by the customer premise device, then the additional content may include statistical information (e.g., a box score, a play-by-play analysis, etc.) associated with the sports program. As another example, additional content associated with a commercial may include detailed information associated with an advertised product or a coupon associated with the advertised product. Other types of additional information will be appreciated.

Once identified, the additional content may be communicated to the customer device for presentation and/or other output to the customer or user. In certain embodiments, the service provider may communicate the additional content to the customer device. The service provider may obtain the additional content from an associated memory or storage device. Additionally or alternatively, the service provider may obtain the additional content from one or more suitable content providers or third-party data sources. In other embodiments, the service provider may facilitate the establishment of a communications session between the customer device and a content provider (e.g., communicate a link to the content provider to the customer device, transfer or pass off a communications session to a content provider, etc.), and the content provider may communicate additional content to the customer device.

A wide variety of suitable applications and/or program modules, such as a browser program or a dedicated application, may be utilized by the customer device to facilitate the receipt and processing of additional content. In certain embodiments, a communications session may be established between a customer device application and the service provider (and/or a content provider). In this regard, additional content may be received by the customer device via the application. The application may then process the received additional content and output at least a portion of the additional content.

System Overview

An example system 100 for facilitating the delivery of additional content in association with broadband content will now be described illustratively with respect to FIG. 1. The system 100 may include, for example, one or more service provider computers 105, any number of customer premise devices 110, and/or any number of customer devices 115A-N. The service provider computers 105 may be associated with a service provider (e.g., a cable service provider, a satellite service provider, etc.) that provides broadband and/or telecommunications services to customers. Additionally, the service provider computers 105 may be configured to identify a pairing between a customer premise device 110 and a customer device (individually referred to as customer device 115) and to facilitate the provision of additional content to the customer device 115.

The customer premise devices 110 may include any suitable devices, such as set-top boxes, embedded set-top boxes, virtual set-top boxes, and/or other programming processing components configured to receive and process one or more broadband data signals output by the service provider. The customer devices 115A-N may include any suitable devices, such as a mobile device 115A, a tablet computer 115B, or a personal computer 115N, that may be configured to receive and process additional content associated with the broadband content processed by the customer premise devices 110. In certain embodiments, a customer premise device. 110 and one or more customer devices 115A-N may be positioned in or otherwise associated with a customer location 125, such as a household, business, or other location.

Any number of suitable networks 120 may facilitate communications between the various components of the system 100. Additionally, in certain embodiments, one or more content providers 130 may provide additional content to the service provider computers 105 and/or the customer devices 115A-N. As desired, one or more components of the system 100 may be processor-driven components or devices. Additionally, in certain embodiments, certain components of the system 100 may be combined. Each of the components of the system 100 will now be described in greater detail.

First, any number of service provider computers 105 and/or other service provider devices may be associated with a suitable service provider, such as a cable service provider, a satellite service provider, or another service provider. The service provider may include any number of systems and/or devices that control the output of content for receipt by the customer premise devices 110 and/or the customer devices 115A-N, including but not limited to, one or more service provider head-end components, one or more conditional access servers, one or more encryption devices, one or more electronic program guide servers, one or more network recording servers, one or more on-demand servers, and/or one or more pay-per-view servers. In certain embodiments, the service provider computers 105 may control the output of broadband content and/or additional content associated with the broadband content. In operation, the broadband content, such as content received from one or more content providers 130, may be formatted for output to one or more customer premise devices 110 via any number of appropriate signals (e.g., a broadband signal, a packet-switched signal, etc.). According to an aspect of the disclosure, the service provider computers 105 may identify pairings between customer premise devices 110 and customer devices 115A-N, and the service provider computers 105 may facilitate the provision of additional content to the customer devices 115A-N based upon the identified pairings.

A service provider computer 105 may be a suitable processor-driven device configured to facilitate the provision of content, such as additional content associated with broadband content, to customers of a service provider. Examples of suitable processor-driven devices that may be utilized as a service provider computer 105 include, but are not limited to, a server computer, a personal computer, a digital assistant, a personal digital assistant, a digital tablet, an Internet appliance, an application-specific circuit, a microcontroller, a minicomputer, any other processor-based device, and/or any combination of processor-driven devices. The execution of suitable computer-implemented instructions or computer-executable instructions by the service provider computer 105 may form a special purpose computer or other particular machine that is operable to facilitate the identification of pairings between customer premise devices 110 and customer devices 115A-N, the identification of broadband content output by the customer premise devices 110, the identification of additional content (including sources of additional content) associated with the broadband content, and/or the communication of the additional content to the customer devices 115A-N.

In addition to one or more processors 131, the service provider computer 105 may include one or more memory devices 132, one or more input/output ("I/O") interfaces 133, and/or one or more network interfaces 134. The processors 131 may be configured to execute any number of software applications and/or computer-readable or computer-executable instructions. The memory devices 132 may include any number of suitable memory devices, such as caches, read-only memory devices, random access memory devices, flash memory devices, magnetic storage devices, etc. The memory devices 132 may store data, executable instructions, and/or various program modules utilized by the processors 131. Examples of data that may be stored by the memory devices 132 include data files 135 and/or any number of suitable databases 140 and/or other data repositories. Additionally, the memory devices 132 may be configured to store any number of suitable program modules and/or applications that may be executed by the processors 131, such as an operating system ("OS") 136 and/or one or more additional content applications 137.

The data files 135 may include any suitable data that facilitates the operation of the service provider computer 105, the identification of pairings, and/or the facilitation and/or control of the communication of additional content to the customer devices 115A-N. For example, the data files 135 may include, but are not limited to, information that facilitates communication with any number of customer premise devices 110 and/or customer devices 115A-N, customer premise device and/or customer device identification information (e.g., device identifiers, telephone numbers, Internet Protocol addresses, network addresses, device capabilities, etc.), customer identification information, customer profile information (e.g., additional content preferences, etc.), information associated with broadband content output by the customer premise devices 110 (e.g., channel identification information, program identification information, timing information, etc.), information that facilitates communication with one or more content servers 130, and/or information that facilitates the provision of additional content to the customer devices 115A-N. The databases 140, which may include any number of internal and/or external databases, may include a wide variety of data utilized by the service provider computers 105, such as various types of additional content. The additional content may include additional content generated by the service provider and/or additional content received from any number of other systems and/or devices, such as the content providers 130. A wide variety of different types of additional content may be utilized as desired, including but not limited to, advertising information, coupons and/or offers, statistical information, detailed explanatory information, rating information, survey information, and/or other types of supplemental content. Any number of suitable databases and/or data repositories may be utilized as desired in various embodiments of the invention, and the described databases are provided by way of example only.

The OS 136 may be a suitable software module that controls the general operation of the service provider computer 105. The OS 136 may also facilitate the execution of other software modules by the processors 131, for example, the one or more additional content applications 137. As desired, the service provider computer 105 may include one or more host modules that facilitate the establishment of a communications session with one or more customer premise devices 110 and/or customer devices 115A-N. In this regard, the service provider computer 105 may receive information utilized to identify pairings and/or information utilized to identify a current location within output broadband content. Additionally, the service provider computer 105 may communicate or otherwise facilitate communication of additional content to the customer devices 115A-N. Examples of suitable host modules include Web hosting modules and/or other suitable server modules, such as modules that facilitate communication with dedicated customer device applications configured to receive and process additional content. Indeed, a wide variety of suitable communications techniques and/or connections may be established between the service provider computer 105 and one or more other components of the system 100.

The additional content application 137 may include any number of suitable software module and/or applications that facilitate the identification of pairings between customer premise devices 110 and customer devices 115A-N and/or the identification and/or communication of additional content to customer devices 115A-N. In operation, an example additional content application 137 may utilize a wide variety of suitable methods and/or techniques to identify a pairing between a customer premise device. 110 and a customer device 115. For example, identifying information associated with a customer device 115 (e.g., a device identifier, a telephone number, a network address, etc.) may be received from a customer premise device 110. In this regard, both the customer device 115 and the customer premise device 110, as well as a pairing or association of the devices, may be identified by the additional content application 137. As another example, identifying information associated with a customer premise device 110 (e.g., a device identifier, a selection of a customer premise device 110, etc.) may be received from a customer device 115, and a pairing or association may be identified or determined based at least in part upon the received identifying information. As yet another example, the additional content application 137 may direct the service provider computer 105 to communicate a code or other identifier to a device for output, and the receipt of the code from another device may be utilized to identify a pairing. For example, a code may be communicated to a customer premise device 110 for output to a customer (e.g., display or other presentation) or a customer device 115. The code may then either be entered into the customer device 115 by the customer or received by the customer device 115 via one or more suitable communications between the customer device 115 and the customer premise device 110. The code may then be communicated by the customer device 115 to the service provider computer 105 and evaluated by the additional content application 137 in order to identify a pairing.

Once a pairing has been identified, in certain embodiments, the additional content application 137 may establish a communications session with the customer device 115. For example, a communications session may be established between the additional content application 137 (or a host module) and an additional content application 157 associated with the customer device 115. In other embodiments, a communications session may be established with the customer device 115 prior to the identification of a pairing. For example, a communications session may be established in order to receive information from the customer device 115 that is utilized to identify a pairing. As another example, a communications session may be established based upon information received from the customer premise device 110 (e.g., a network address, a telephone number, etc.), and a pairing may be identified and/or confirmed based upon the establishment of the communications session.

The additional content application 137 may also receive information associated with the broadband content being output by the customer premise device 110. For example, the customer premise device 110 may communicate a message including a wide variety of different types of information associated with output content, such as an identifier of the customer premise device 110, a channel identifier (e.g., an identifier of a current channel to which the customer premise device 110 is tuned), a program identifier (e.g., an identifier of current content being output, etc.), and/or timing information associated with the content (e.g., timing delay information, a timing offset, a point in time within a program or other content, etc.). As desired, information may be periodically pushed from the customer premise device 110 to the service provider computer 105. For example, a periodic programming, message or annunciation message may be communicated and processed by the additional content application 137. Alternatively, information may be communicated to the service provider computer 105 in response to a received request for the information.

Based at least in part upon the received information associated with the output content, the additional content application 137 may identify a current location within the broadband content being output by the customer premise device. For example, the additional content application 137 may identify a current location or point in time within an output television program, movie, video on-demand program, or pay-per-view program. In this regard, the additional content application 137 may identify or determine the current output of the customer premise device 110. The additional content application 137 may then identify additional content (and/or a source of additional content) associated with the content output by the customer premise device 110. For example, the additional content application 137 may identify supplemental content associated with the output broadband content. A wide variety of different types of additional content may be identified as desired in various embodiments, such as advertising information, coupons and/or offers, statistical information, detailed explanatory information, rating information, survey information, and/or other types of supplemental content. For example, if a sports program is output by the customer premise device 110, then the additional content may include statistical information (e.g., a box score, a play-by-play analysis, etc.) associated with the sports program. As another example, additional content associated with a commercial may include detailed information associated with an advertised product or a coupon associated with the advertised product. As yet another example, additional content associated with a program that requests viewer voting (e.g., a dancing competition program, etc.) may include information associated with the various contestants and/or information that facilitates the collection of one or more votes. Other types of additional information will be appreciated.

Once identified, the additional content may be communicated to the customer device 115 for presentation and/or other output to the customer or user. In certain embodiments, the additional content application 137 may direct the service provider computer 105 to communicate the additional content to the customer device 115. For example, the additional content application 137 may access or obtain the additional content from the data files 135 and/or databases 140, and at least a portion of the additional content may be communicated to the customer device 115. Additionally or alternatively, the additional content application 137 may obtain the additional content from one or more suitable content providers 130 or third-party data sources. For example, the additional content application 137 may generate and direct the communication of additional content requests to one or more content providers 130, such as a content provider associated with the output broadband content. Additional content may then be received in response to the requests, and at least a portion of the received additional content may be communicated to the customer device 115.

In other embodiments, the additional content application 137 may facilitate the establishment of a communications session between the customer device 115 and a content provider 130, and the content provider 130 may communicate additional content to the customer device 115. For example, the additional content identified by the additional content application 137 may include an identification of the content provider 130 and/or information that facilitates the establishment of a communications session with the content provider 130. The additional content application 137 may then communicate the additional content (e.g., the content provider identification information, etc.) and, as desired, information associated with a current location within the broadband content, to the customer device 115, and the customer device 115 may utilize the received additional content to establish a communications session with the content provider 130. In this regard, other additional content may be received by the customer device 115 from the content provider 130. As another example, the additional content application 137 may facilitate a transfer or pass off a communications session with the customer device 115 to a content provider 130.

As set forth above, a wide variety of different types of additional content may be associated with output broadband content. In certain embodiments, the additional content application 137 may evaluate customer preferences (e.g., customer profile information, etc.) in order to determine types of additional content that the customer would like to receive and/or types of additional content that the customer does not wish to receive. For example, the additional content application 137 may determine that a customer does not wish to receive certain types of advertisements. As another example, the additional content application 137 may determine that a customer watching a football game desires to receive statistical information associated with the football game as additional content. Additionally, the additional content application 137 may identify or determine desired formatting for additional content based upon customer preferences and/or parameters. Using the example of the football game, the additional content application 137 may determine that the customer is a fan of one of the teams, and the additional content application 137 may provide detailed statistical information for the identified team.

In certain embodiments, the additional content application 137 may additionally identify one or more capabilities (e.g., input capabilities, output capabilities, etc.) of the customer device 115. Additional content may then be identified and/or formatted in accordance with the identified capabilities. For example, if it is determined that the customer device 115 has the ability to output high-definition video, then high-definition video may be communicated as additional content. As another example, if it is determined that the customer device 115 includes a touch screen display, then additional content may be formatted in order to interact with the touch screen display. Indeed, a wide variety of different parameters and/or capabilities may be taken into consideration by the additional content application 137.

A few examples of the operations that may be performed by the additional content application 137 are described in greater detail below with reference to FIGS. 2-4.

With continued reference to the service provider computer 105, the one or more I/O interfaces 133 may facilitate communication between the service provider computer 105 and one or more input/output devices, for example, one or more user interface devices, such as a display, keypad, mouse, pointing device, control panel, touch screen display, remote control, microphone, speaker, etc., that facilitate user interaction with the service provider computer 105. In this regard, user commands may be received by the service provider computer 105. The one or more network interfaces 134 may facilitate connection of the service provider computer 105 to one or more suitable networks 120 that facilitate communications with customer premise devices 110 and/or customer devices 115A-N, for example, a broadband network or service provider network (e.g., a cable network, a satellite network, etc.), a cellular network, and/or any other suitable wide area network (e.g., the Internet, etc.).

With continued reference to FIG. 1, any number of customer premise devices 110 may be associated with various customers of a service provider. Examples of suitable customer premise devices 110 include, but are not limited to, a set-top box ("STB") (e.g., a cable STB, a digital satellite STB, an Internet Protocol Television STB, etc.), a virtual STB, an embedded STB, a broadband modem, another programming processing component, etc. A customer premise device 110 may typically be situated at a customer location 125 (e.g., a household, etc.) to which the service provider provides broadband services. As such, a customer premise device 110 may include a suitable broadband interface that facilitates connection of the customer premise device 110 to a broadband network, such as a cable network or a satellite network. In certain embodiments, a customer premise device 110 may be connected to one or more display devices, such as a television, associated with a customer. In other embodiments, the customer premise device 110 may be embedded, incorporated into, and/or executed on the display device. In operation, a customer premise device 110 may receive at least a portion of a broadband data signal output by a service provider, and the customer premise device 110 may convert at least a portion of the received signal into content which is displayed or otherwise output by the display device.

As desired, a broadband signal provided to the customer premise device 110 may include a wide variety of data components, including but not limited to, a television signal, a digital television signal, electronic program guide information, Enhanced TV Binary Interchange Format ("EBIF") applications, on-demand and/or pay-per-view data, data associated with content recorded at a network level, data associated with a Voice Over Internet Protocol ("VoIP") telephone service, data associated with Internet service, data associated with home monitoring services, etc. The customer premise device 110 may receive and process the broadband signal. As desired, the customer premise device 110 may selectively output a portion of the broadband signal, such as digital television data (e.g., audio and/or video data), electronic program guide data, various Web pages, etc., to the display device for display. Additionally, in certain embodiments, the customer premise device 110 may output audio data to any number of audio components, such as a home theater system, a stereo system, etc.

A customer premise device 110 may be a suitable processor-driven device that facilitates the receipt, processing, presentation, and/or output of broadband content. Additionally, the customer premise device 110 may be a suitable processor-driven device that facilitates the communication of information associated with output broadband content and, as desired, customer device 115 identification information, to the service provider computers 105 for processing. As such, the customer premise device 110 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the customer premise device 110 may form a special purpose computer or other particular machine that is operable to facilitate the processing of broadband content and/or the communication of upstream data to the service provider computers 105.

With reference to FIG. 1, the customer premise device 110 may include one or more processors 141, one or more memory devices 142, one or more input/output ("I/O") interfaces 143, and/or one or more network interfaces 144. The processors 141 may be configured to execute any number of software applications and/or computer-readable or computer-executable instructions. The memory devices 142 may include any number of suitable memory devices, such as caches, read-only memory devices, random access memory devices, flash memory devices, magnetic storage devices, removable storage devices (e.g., memory cards, etc.), and/or other memory devices. The memory devices 142 may include internal memory devices and/or external memory devices in communication with the customer premise device 110. The memory devices 142 may store data, executable instructions, and/or various program modules utilized by the processors 141. Examples of data that may be stored by the memory devices 142 include data files 145 and/or any number of suitable program modules that may be executed by the processors 141, such as an operating system ("OS") 146, a program module 147, and/or a pairing module 148.

The data files 145 may include any suitable data that facilitates the operation of the customer premise device 110, the processing of a received broadband content, the collection of customer device information, and/or the communication of customer device and/or broadband content information to the service provider computers 105. For example, the data files 145 may include, but are not limited to, customer premise device identification information, information associated with customer devices 115 (e.g., customer device identifiers, a list of customer devices in communication with the customer premise device 110, etc.), electronic program guide information, video on-demand information, pay-per-view information, information associated with executing EBIF applications, and/or timing information (e.g., timing offset information, delay information, information associated with a current point in time for content, etc.).

The OS 146 may be a suitable software module that controls the general operation of the customer premise device 110. The OS 146 May also facilitate the execution of other software modules, for example, the program module 147 and/or the pairing module 148. As desired, the customer premise device 110 may include an interactive program guide ("IPG") module or application that processes program guide information received by the customer premise device 110. For example, electronic program guide ("EPG") information may be included in data received by the customer premise device 110. The IPG module may format at least a portion of the received EPG data for presentation to a customer via an IPG grid. For example, received EPG data may be parsed and organized by channel and time slot. The organized data may then be formatted for display in an IPG grid. Once presented, a customer may navigate through a displayed IPG grid in order to view scheduled content, such as current and upcoming television content. As desired, the customer may utilize the IPG grid to request the receipt or delivery of desired content. For example, the user may select an individual entry included in the grid, and the user may request that the content associated with the grid entry be delivered to the customer premise device 110. As desired, once desired content is selected, the customer premise device 110 and/or the program module 147 may identify the content and track a current location within the content.

The program module 147 or program application may be a suitable software module or application that facilitates the processing and/or output of received content. For example, the program module 147 may be configured to format at least a portion of a received content item (e.g., a television program, video on-demand content, a movie, Internet content, etc.) for output by the customer premise device 110 and/or presentation to the customer. A wide variety of content may be formatted for output by the program module 147 as desired in various embodiments including, but not limited to, television content, audio content, VoIP telephone content, electronic program guide data, Internet and/or Web site content, etc. Additionally, the program module 147 may be configured to receive and process user or customer commands associated with the output of content. For example, the program module 147 may be configured to process user commands received Via one or more suitable input devices and/or user voice commands. As one example, the program module 147 may be configured to process customer or user commands to receive desired content items, such as commands received via a user's interaction with an IPG grid.

The pairing module 148 may be a suitable software module or application that facilitates the identification of a customer device 115 to be paired with the customer premise device 110 and the communication of customer device information to the service provider computers 105. A wide variety of suitable methods and/or techniques may be utilized by the pairing module 148 to identify a customer device 115 and/or to collect customer device information. As one example, the pairing module 148 may generate and output one or more interfaces configured to receive a customer selection of a customer device 115 (e.g., a selection of a customer device 115 from a list of available customer devices 115A-N for which information is stored) or a customer device identifier (e.g., a telephone number, a network address, etc.). In the event that a customer device selection is received, stored information associated with the customer device 115 and information associated with the customer premise device 110 may be communicated to the service provider computers 105 to facilitate the identification of a pairing. In the event that a customer device identifier is received, the pairing module 148 may communicate the received identifier (and customer premise device 110 information) to the service provider computer 105 to facilitate the identification of a pairing. Alternatively, the pairing module 148 may evaluate the received identifier in order to identify stored information associated with the customer device 115 or to establish communication with the customer device 115 in order to obtain customer device information. The customer device information may then be communicated to the service provider computers 105.

As another example of collecting customer device information, communication may be established between the customer premise device 110 and a customer device 115. For example, communication may be established via any number of suitable customer networks, such as a Wi-Fi enabled network, a Bluetooth-enabled network, a radio frequency network, a wireless network, a home area network, or another suitable network. Once communication has been established, customer identification information and, as desired, other information (e.g., a code or other information received by the customer device 115 from the service provider computers 105) may be received by the customer premise device 110. At least a portion of the received information may then be communicated to the service provider computers 105 to facilitate the identification of a pairing between the customer premise device 110 and the customer device 115.

In certain embodiments, the pairing module 148 may output pairing information that may be received by the customer device 115 and communicated by the customer device 115 to the service provider computers 105. For example, identification information associated with the customer premise device 110 and/or information received from the service provider computers 105 (e.g., a code or other information to facilitate a pairing, etc.) may be communicated to the customer device 115 (e.g., communicated via an established communications session, etc.) or output for presentation to the customer (e.g., presentation via a display device, etc.). If output for presentation to the customer, the customer may enter the information into the customer device 115 to facilitate the establishment of a pairing. Other methods and/or techniques for facilitating the collection of pairing information will be appreciated. The techniques described above are provided by way of example only.

Additionally, the pairing module 148 (or the program module 147 or another suitable module) may be configured to communicate information associated with output broadband content to the service provider computers 105. In certain embodiments, the pairing module 148 may be configured to periodically (or upon the identification of a predetermined event, such as the selection of content, a play event, a pause event, etc.) generate and output a message, such as an annunciation message, that includes information associated with the output broadband content. In other embodiments, the pairing module 148 may communicate information associated with the broadband content to the service provider computers 105 in response to a received request for the information. A wide variety of broadband content information may be output as desired in various embodiments of the invention, such as identification information for the customer premise device 110 (e.g., a device identifier, a customer identifier, a customer account identifier, etc.), channel information (e.g., a channel number, a virtual channel number, a channel version identifier, etc.), program identification information (e.g., a program identifier, program version information, etc.), and/or a wide variety of timing information (e.g., a current time associated with the customer premise device 110, timing information within the received broadband content, timing content associated with recorded broadband content, timing delay information, timing offset information, etc.). The additional content applications 137 associated with the service provider computers 105 may process the received information in order to identify the content output by the customer premise device 110 and/or to determine a current location or point in time within the content.

With continued reference to the customer premise device 110, the one or more I/O interfaces 143 may facilitate communication between the customer premise device 110 and one or more input/output devices, for example, one or more user interface devices, such as a remote control, display, keypad, mouse, pointing device, control panel, touch screen display, microphone, speaker, etc., that facilitate user interaction with the customer premise device 110. In this regard, user commands may be received by the customer premise device 110, and received content may be output. The one or more network interfaces 144 may facilitate connection of the customer premise device 110 to one or more suitable networks, such as networks 120. In this regard, the customer premise device 110 may receive broadband content and/or communicate with other components of the system 100.

With continued reference to FIG. 1, any number of customer devices, such as devices 115A-N, may be provided. A customer device (individually referred to as customer device 115) may be a suitable device configured to receive and process additional content associated with broadband content output by the customer premise device 110. A wide variety of suitable customer devices, such as a mobile device 115A, a tablet computer 115B, or a personal computer 115N, may be provided. In certain embodiments, the customer devices 115A-N may provide additional outlets for customers of the service provider to receive and/or view content. For example, the customer devices 115A-N may provide additional outlets for receiving and displaying additional or supplemental content associated with output broadband content.

An example customer device 115 will now be described. The customer device 115 may be a suitable processor-driven device that facilitates the receipt, processing, presentation, and/or output of additional content. Additionally, the customer device 115 may be a suitable processor-driven device that facilitates the communication of pairing information (e.g., information collected from a customer premise device 110, information entered by a customer, etc.) to the service provider computers 105. As such, the customer device 115 may include any number of computing devices, such as a personal computer, a digital assistant, a personal digital assistant, a digital tablet, an Internet appliance, an application-specific circuit, a microcontroller, a minicomputer, or any other processor-based device. The execution of suitable computer-implemented instructions or computer-executable instructions by the customer device 115 may form a special purpose computer or other particular machine that is operable to facilitate the receipt and processing of additional information and, in certain embodiments, the communication of pairing information to the service provider computers 105.

With reference to FIG. 1, the customer device 115 may include one or more processors 151, one or more memory devices 152, one or more input/output ("I/O") interfaces 153, and/or one or more network interfaces 154. The processors 151 may be configured to execute any number of software applications and/or computer-readable or computer-executable instructions. The memory devices 152 may include any number of suitable memory devices, such as caches, read-only memory devices, random access memory devices, flash memory devices, magnetic storage devices, removable storage devices (e.g., memory cards, etc.), and/or other memory devices. The memory devices 152 may include internal memory devices and/or external memory devices in communication with the customer device 115. The memory devices 152 may store data, executable instructions, and/or various program modules utilized by the processors 151. Examples of data that may be stored by the memory devices 152 include data files 155 and/or any number of suitable program modules that may be executed by the processors 151, such as an operating system ("OS") 156 and/or an additional content application 157.

The data files 155 may include any suitable data that facilitates the operation of the customer device 115, the communication of pairing information to the service provider computers 105, the receipt of additional content, and/or the processing of additional content. For example, the data files 155 may include, but are not limited to, customer profile information (e.g., customer preferences associated with additional content), device profile information (e.g., customer device identification information, customer device capabilities, etc.), information that facilitates communication with the customer premise device 110, the service provider computers 105, and/or the content providers 130, received additional content, and/or customer input received in association with the additional content.

The OS 156 may be a suitable software module that controls the general operation of the customer device 115. The OS 156 may also facilitate the execution of other software modules, for example, the additional content application 157. The additional content application 157 or additional content module may be a suitable software module or application that facilitates the receipt and processing of additional content. In certain embodiments, the additional content application 157 may be a dedicated application configured to facilitate the receipt and processing of additional content, such as an application downloaded to, provisioned to, or otherwise provided to the customer device 115 by the service provider computers 105 and/or any other suitable application distribution system (e.g., an application store, a Web server, etc.). In other embodiments, the additional content application 157 may be a general purpose application, such as a suitable browser application, that is capable of receiving and processing additional content. In either case, the additional content application 157 may form a suitable application programming interface ("API") that facilitates the receipt of additional content.

In operation, the additional content application 157 may receive additional content associated with broadband content output by the customer premise device 110. The additional content application 157 may process the received additional content, and output at least a portion of the additional content for presentation to a customer. In certain embodiments, additional content may be received from the service provider computers 105. In other embodiments, additional content may be received from any number of content providers 130. As desired, the additional content application 157 may be configured to establish communication (e.g., link to, etc.) with the service provider computers 105 and/or a content provider 130.

In certain embodiments, the additional content application 157 may function or operate as a sandbox for receiving and outputting additional content. In this regard, a device that communicates the additional content to the customer device 115 may format the additional content for presentation by the additional content application 157. The additional content application 157 may provide flexibility for presenting the formatted additional content.

As desired in various embodiments, the additional content application 157 may also be configured to receive and process a wide variety of user or customer input. For example, a request for additional content may be received and processed. As desired, desired additional content may be requested from a source of the additional content. Certain requests may be requests for initial additional content. Other requests may be requests (e.g., a request to download a coupon, a selection of a hyperlink, etc.) associated with additional content presented to the customer. As another example, input associated with input requests included in the additional content (e.g., survey requests, rating requests, voting requests, etc.) may be received, processed, and/or communicated to a designated recipient. As yet another example, input associated with the identification of a pairing with a customer premise device 110 may be received and processed.

As desired in certain embodiments, the additional content application 157 may be configured to collect and communicate a wide variety of pairing information that is communicated to the service provider computers 105 to facilitate the identification of a pairing between the customer device 115 and a customer premise device 110. For example, a list of available customer premise devices (e.g., a list generated from stored customer premise device information, a list generated based upon local network communication with one or more customer premise devices, etc.) may be output by the additional content application 157, and a user selection of a customer premise device 110 may be received and processed. Customer premise device information and, as desired, customer device information (e.g., a customer device identifier, etc.) may be communicated to the service provider computers 105 to facilitate the identification of a pairing. As another example, a code or other information output by the customer premise device 110 may be received by the additional content application 157 (e.g., received via a network communication, received via user input, etc.), and the received code may be communicated to the service provider computers 105 to facilitate the identification of a pairing. As yet another example, a communications session may be established with a customer premise device 110, and customer premise device information may be received via the communications session. At least a portion of the received information may then be communicated to the service provider computers 105 to facilitate the identification of a pairing.

As an alternative to communicating pairing information to the service provider computers 105, the additional content application 157 may be configured to provide pairing information to a customer premise device 110. For example, a communications session may be established between the customer device 115 and the customer premise device 110, and identification information for the customer device 115 may be communicated to the customer premise device 110. Once received by the customer premise device 110 (e.g., received from the customer device 115, received via user input, etc.), the customer premise device 110 may communicate pairing information to the service provider computers 105.

Additionally, as desired in various embodiments, the additional content application 157 may be configured to store and/or communicate a wide variety of additional content preferences (e.g., preferences associated with desired additional content, preferences associated with undesired additional content, formatting preferences, etc.) to the service provider computers 105. Similarly, as desired, the additional content application 157 may be configured to store and communicate a wide variety of information associated with customer device capabilities (e.g., display capabilities, user input capabilities, etc.) to the service provider computers 105.

In certain embodiments, it may be assumed that the customer device 115 is situated within a subscription area of the customer based at least in part upon an identified pairing between the customer device 115 and the customer premise device 110. For example, it may be assumed that the customer device 115 is located within a subscription area associated with the customer location 125. Accordingly, the service provider may communicate broadband content to the customer device 115 without violating content distribution agreements with various content providers 130. With respect to additional content, it may be possible to communicate a wide variety of supplemental or additional content to the customer device 115 regardless of the location of the customer device 115 because the same content provider restrictions may not be applicable to additional content. Accordingly, in certain embodiments, additional content may be communicated to the customer device 115 event if the customer device 115 is removed from the customer location 125. For example, in the event that a customer watching a sporting event at the customer location 125 leaves the customer location 125 with a mobile customer device, additional content associated with the sporting event (e.g., a box score, play-by-play information, etc.) may continue to be communicated to the customer device 115. As desired, communications between the customer device 115 and the service provider computers 105 may be transferred between various networks as the customer device 115 is moved from one location to another. For example, a broadband network (e.g., a cable network, etc.) may be utilized to communicate (e.g., communicate via a modem and/or router) additional content to the customer device 115 when the customer device 115 is located within the customer location 125. When the customer device 115 is taken outside of the customer location 125, a cellular network or other network may be utilized to communicate additional content.

One example of the operations that may be performed by the additional content application 157 is described in greater detail below with reference to FIG. 5.

With continued reference to the customer device 115, the one or more I/O interfaces 153 may facilitate communication between the customer device 115 and one or more input/output devices, for example, one or more user interface devices, such as a display, keypad, mouse, pointing device, control panel, touch screen display, microphone, speaker, etc., that facilitate user interaction with the customer device 115. In this regard, user commands may be received by the customer device 115, and received content may be output. The one or more network interfaces 154 may facilitate connection of the customer device 115 to one or more suitable networks, such as networks 120. In this regard, the customer device 115 may communicate with any number of the other components of the system 100.

As desired in certain embodiments, one or more content providers 130 may be provided. A content provider 130 may include any number of suitable devices and/or systems configured to provide broadband content and/or additional content to the service provider and/or directly to the customer premise device. An example content provider 130 may be a content provider associated with a television network. As desired, a content provider may include any number of systems and/or devices having components similar to those described above for the service provider computer 105, such as one or more processors, memory devices, I/O interfaces, and/or network interfaces.

In certain embodiments, a content provider 130 may be configured to provide additional content to the service provider computers 105. For example, additional content may be communicated for storage and subsequent access by the service provider computers 105. Alternatively, additional content may be communicated to the service provider computers 105 in response to a received request. In other embodiments, a content provider 130 may provide additional content directly to a customer device 115. For example, the service provider computers 105 may facilitate the establishment of a communications session between the content provider 130 and the customer device 115. As another example, the service provider computers 105 may transfer a communications session with the customer device 115 to the content provider 130. Once a communications session has been established or transferred, the content provider 130 may communicate additional content to the customer device 115.

Communications between various components of the system 100 may be facilitated via any number of suitable networks, such as the illustrated networks 120. Example networks 120 include, but are not limited to, one or more service provider networks (e.g., a cable network, a satellite network, etc.), telecommunication networks, and/or data networks, whether public, private, or a combination thereof, including but not limited to, a wide area network, the Internet, public switched telephone networks, satellite networks, cable networks, cellular networks, and/or any combination thereof and may be wired and/or wireless. Although not illustrated, other networks may be suitable user or customer networks that facilitate communication between customer devices 115A-N and customer premise devices 110 at a customer location 125 or content consumption location. Examples of suitable user networks include, but are not limited to, local area networks, Bluetooth-enabled networks, Wi-Fi enabled networks, home area networks ("HANs"), Zigbee networks, Multimedia over Coax Alliance ("MoCA") networks, radio frequency networks, mesh networks, local wired networks, local wireless networks, etc.

Those of ordinary skill in the art will appreciate that the system 100 shown in and described with respect to FIG. 1 is provided by way of example only. Numerous other operating environments, system architectures, and device configurations are possible. Other system embodiments can include fewer or greater numbers of components and may incorporate some or all of the functionality described with respect to the system components shown in FIG. 1.

Operational Overview

Figure 2:
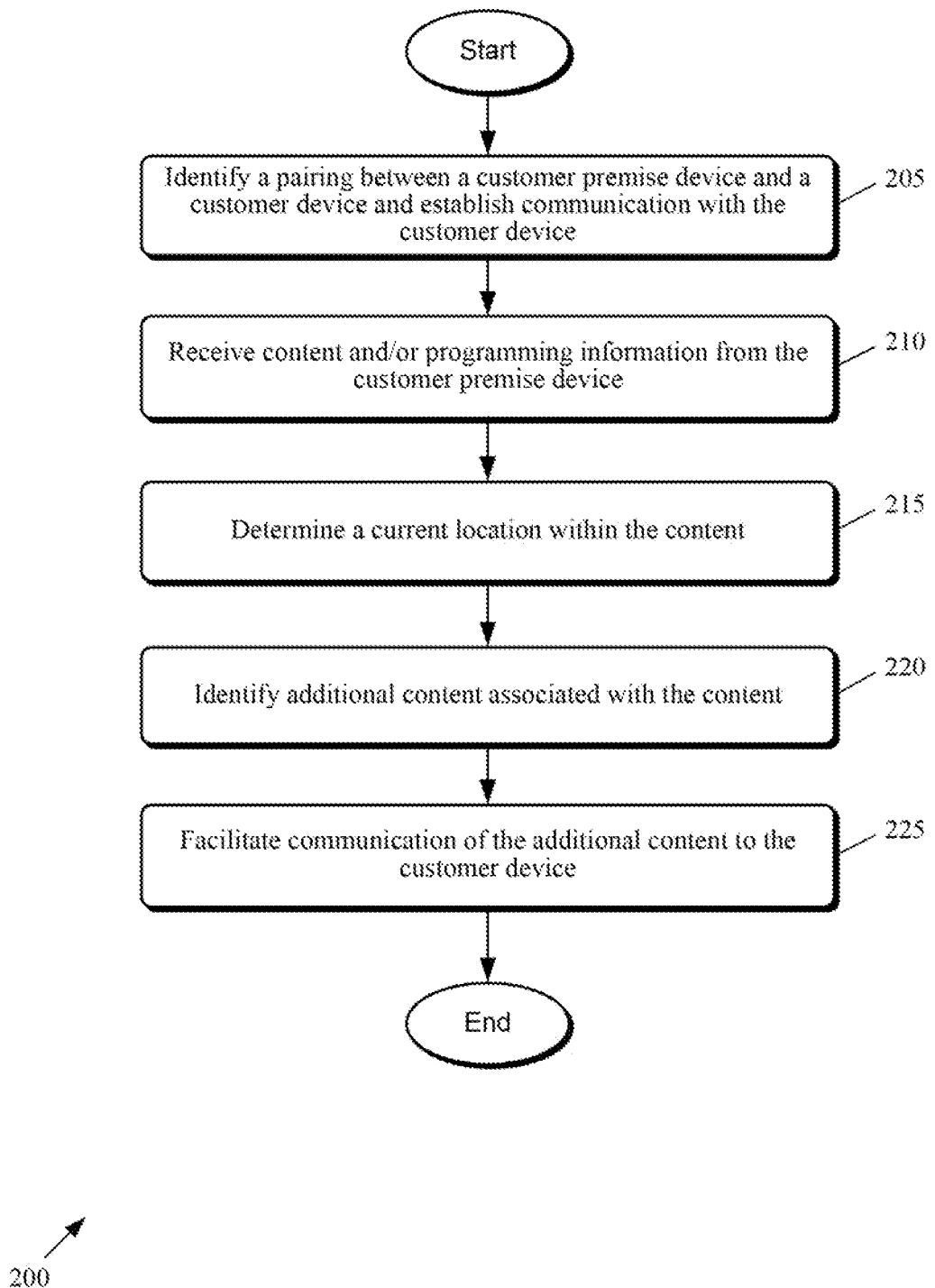
FIG. 2 is a flow diagram of one example method for facilitating the provision of additional information to a customer device based at least in part upon an identified pairing between the customer device and a customer premise device, according to an illustrative embodiment of the disclosure.

FIG. 2 is a flow diagram of one example method for facilitating the provision of additional information to a customer device based at least in part upon an identified pairing between the customer device and a customer premise device, according to an illustrative embodiment of the disclosure. The method 200 may be performed by one or more suitable additional content applications associated with one or more service provider computers, such as the additional content applications 137 associated with the service provider computers 105 illustrated in FIG. 1. The method 200 may begin at block 205.

At block 205, a pairing or other association may be identified between a customer premise device and a customer device, such as the customer premise device 110 and customer device 115 illustrated in FIG. 1. The customer premise device 110 may be configured to output broadband content (e.g., television content, movies, video on-demand content, recorded content, content streamed from a service provider, pay-per-view content, etc.) for consumption by a customer. Additionally, the customer device 115 may be configured to receive and output additional content or supplemental content associated with the output broadband content. As desired, a wide variety of suitable methods and/or techniques may be utilized to identify a pairing between the customer premise device 110 and the customer device 115. A few example techniques are described in greater detail below with reference to FIGS. 3A-3C; however, other techniques may be utilized.

Additionally, communication may be established between the service provider computers 105 and the customer device 115. For example, a communications session may be established with an additional content application 157 of the customer device 115. In certain embodiments, a communications session may be established based upon a received request from the customer device 115. For example, the customer device 115 may communicate pairing information to the service provider computers 105, and a communications session may be established by the service provider computers 105 in association with the receipt of pairing information. In other embodiments, the service provider computers 105 may communicate information to the customer device 115 (and/or the additional content application) in order to establish a communications session. For example, the service provider computers 105 may receive customer device information from a customer premise device 110, and the service provider computers 105 may utilize at least a portion of the received information to establish a communications session with the customer device 115.

Once a pairing has been identified, operations may continue at block 210. At block 210, content and/or programming information may be received from the customer premise device 110. For example, the customer premise device 110 may communicate a message including a wide variety of different types of information associated with output broadband content and customer premise device 110 tuning or channel selection to the service provider computers 105. In certain embodiments, information may be periodically pushed from the customer premise device 110 to the service provider computers 105. For example, a periodic programming message or annunciation message may be communicated. In other embodiments, information may be communicated to the service provider computers 105 by the customer premise device 110 in response to a received request for the information. In yet other embodiments, information may be communicated to the service provider computers 105 by the customer premise device 110 based upon the identification of a predetermined event, such as the processing of customer input to access desired content and/or to navigate within or otherwise manipulate desired content. A wide variety of different types of information may be received as desired in various embodiments, including but not limited to, an identifier of the customer premise device 110 (e.g., a media access control address, etc.), channel identification information (e.g., a virtual channel identifier, channel version information, etc.), program identification information (e.g., a program name, program version information, program resolution information, etc.), and/or timing information associated with the content (e.g., timing delay information, a timing offset, a point in time within a program or other content, etc.).

At block 215, at least a portion of the received content and/or programming information may be evaluated in order to determine a current location within broadband content output by the customer premise device 110. For example, a channel and/or program information may be evaluated in order to identify a content item that is output by the customer premise device 110 (e.g., a television show, a movie, recorded content, streaming content, on-demand content, pay-per-view content, etc.). Additionally, timing information may be evaluated in order to identify a current point in time or location within the content. For example, if the output content is a program included in a downstream broadband signal, then a timing delay and/or offset information for the customer premise device 110 may be evaluated in order to determine a current location within the broadband content. As another example, if the output content is content previously recorded by the customer premise device 110 or associated recording equipment (e.g., a digital video recorder, etc.), then a time marker received from the customer premise device 110 may be evaluated in order to determine a current point in time for the content. Indeed, a wide variety of different types of evaluations may be performed in order to determine a current location within output broadband content.

At block 220, additional content (and/or one or more sources of available additional content) associated with the output broadband content may be identified. For example, supplemental content associated with the currently output broadband content may be identified. A wide variety of different types of additional content may be identified as desired in various embodiments, such as advertising information, coupons and/or offers, statistical information, detailed explanatory information, rating information, survey information, and/or other types of supplemental content. As desired, additional content associated with a current point in time or location of broadband content may be identified. In certain embodiments, the service provider computers 105 may identify stored additional content associated with currently output broadband content. In other embodiments, the service provider computers 105 may identify one or more sources of additional content, such as the content providers 130 illustrated in FIG. 1. The service provider computers 105 may then either obtain the additional content from the additional content sources or, alternatively, identify a wide variety of information that facilitates communication of the additional content from the additional content sources to the customer device 115.

At block 225, the service provider computers 105 may facilitate communication of at least a portion of the additional content to the customer device 115. In this regard, the additional content may be processed by the customer device 115 and presented to a customer. In certain embodiments, the service provider computer 105 may communicate the additional content to the customer device 115. For example, additional content may be accessed or obtained from memory, and at least a portion of the additional content may be communicated to the customer device 115. As another example, additional content may be obtained from one or more suitable content providers 130 or third-party data sources. For example, one or more additional content requests may be generated and communicated to one or more content providers 130, such as a content provider associated with the output broadband content. Additional content may then be received in response to the requests, and at least a portion of the received additional content may be communicated to the customer device 115.

In other embodiments, the service provider computers 105 may facilitate the establishment of a communications session between the customer device 115 and a content provider 130, and the content provider 130 may communicate additional content to the customer device 115. For example, the additional content identified by the service provider computers 105 may include an identification of the content provider 130 and/or information that facilitates the establishment of a communications session with the content provider 130. The service provider computers 105 may then communicate the additional content (e.g., the content provider identification information, etc.) and, as desired, information associated with a current location within broadband content, to the customer device 115, and the customer device 115 may utilize the received additional content to establish a communications session with the content provider 130. In this regard, other additional content may be received by the customer device 115 from the content provider 130. As another example, the service provider computers 105 may facilitate a transfer or pass off a communications session with the customer device 115 to a content provider 130. Indeed, a wide variety of suitable methods and/or techniques may be utilized to facilitate the provision of additional content to the customer device 115.

The method 200 may end following block 225.

Figure 3A:
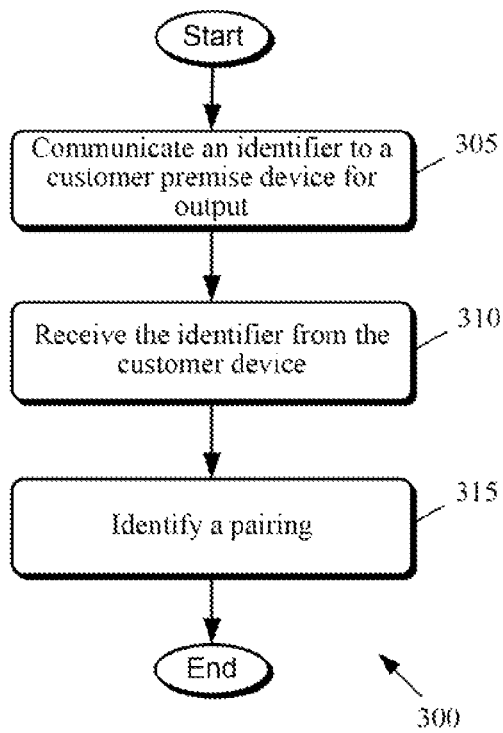
FIGS. 3A-3C are flow diagrams of example methods for identifying a pairing between a customer device and a customer premise device, according to an example embodiment of the disclosure.
Figure 3B:
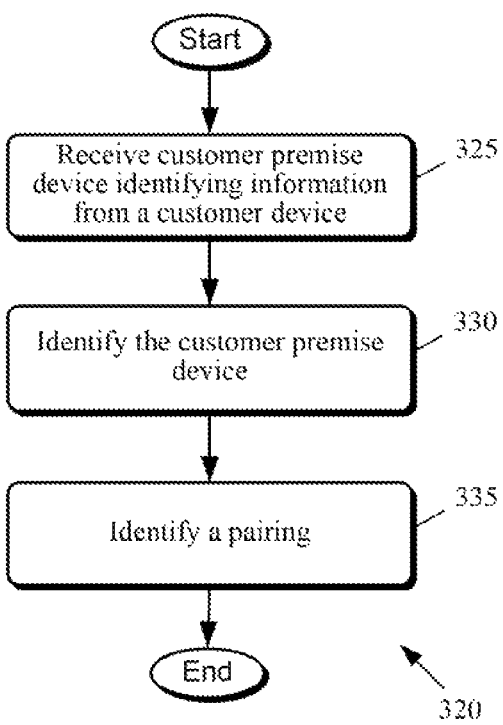
Figure 3C:
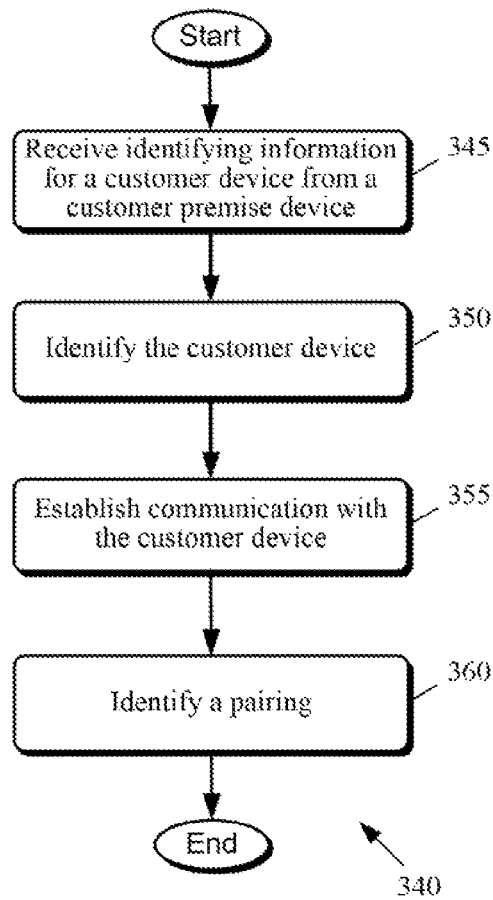

FIGS. 3A-3C are flow diagrams of example methods 300, 320, 340 for identifying a pairing between a customer device and a customer premise device, according to an example embodiment of the disclosure. The methods 300, 320, 340 illustrate a few examples of the operations that may be performed at block 205 of the method 200 illustrated in FIG. 2. As such, the operations of the methods 300, 320, 340 may be performed by one or more suitable additional content applications associated with one or more service provider computers, such as the additional content applications 137 associated with the service provider computers 105 illustrated in FIG. 1.

Turning first to FIG. 3A, a first example method 300 for identifying a pairing between a customer device and a customer premise device is illustrated. The method 300 may begin at block 305. At block 305, an identifier, code, or other information may be communicated by the service provider computers 105 to a customer premise device, such as the customer premise device 110 illustrated in FIG. 1. In this regard, the service provider computers 105 may output the identifier for receipt and/or entry into a customer device, such as the customer device 115 illustrated in FIG. 1. For example, an identifier or code may be output by the customer premise device 110 for presentation via a suitable display (e.g., a television, etc.). A customer may then enter the identifier into a customer device 115. As another example, the identifier or code may be communicated by the customer premise device 110 to the customer device 115.

Once an identifier is received by the customer device 115, the customer device 115 may communicate the identifier to the service provider computers 105. The communicated identifier may then be received by the service provider computers 105 at block 310. At block 315, the service provider computers 105 may evaluate the received code in order to identify a pairing between the customer device 115 and the customer premise device 110. For example, the received identifier may be compared to stored information associated with identifiers communicated to various customer premise devices, and the customer premise device 110 may be identified based upon a determined correspondence between the received identifier and a stored identifier. Additionally, the customer device 115 from which the identifier was received may be identified. For example, a customer device identifier or network address may be identified. A pairing between the customer premise device 110 and the customer device 115 may then be identified or determined.

The method 300 may end following block 315.

FIG. 3B illustrates a second example method 320 for identifying a pairing between a customer device and a customer premise device. The method 320 may begin at block 325. At block 325, information associated with a customer premise device 110 may be received from a customer device 115. For example, an identifier of the customer premise device 110 (e.g., a device name, a MAC address, etc.) may be received from a customer device 115. As another example, an indicator of the customer premise device 110 (e.g., "living room set-top box," "bedroom set-top box," "first set-top box," etc.) and an identifier of a customer and/or customer account may be received.

At block 330, the customer premise device 110 may be identified by the service provider computers 105 based at least in part upon an evaluation of the received information. For example, a received customer premise device identifier may be compared to stored customer premise device identifiers, and the customer premise device 110 may be identified based upon an identified match or correspondence. As another example, received customer identification (and/or customer account information) may be utilized to access customer premise device information associated with the customer. A customer premise device proxy or identifier may then be utilized to evaluate the accessed information and identify a desired customer premise device.

Additionally, the customer device 115 from which the customer premise device identifying information was received may be identified. For example, a customer device identifier or network address may be identified. A pairing between the customer premise device 110 and the customer device 115 may then be identified or determined at block 335.

The method 320 may end following block 335.

FIG. 3C illustrates a third example method 340 for identifying a pairing between a customer device and a customer premise device. The method 340 may begin at block 345. At block 345, identifying information for a customer device 115 may be received from a customer premise device 115. For example, an identifier of the customer device 115 (e.g., a device name, an Internet Protocol address, another device network address, a telephone number etc.) may be received from a customer premise device 110. As another example, an indicator of the customer device 115 (e.g., "John's phone," "John's tablet," etc.) and an identifier of a customer and/or customer account may be received.

At block 350, the customer device 115 may be identified by the service provider computers 105 based at least in part upon an evaluation of the received information. For example, a received customer device identifier may be compared to stored customer device identifiers, and the customer device 115 may be identified based upon an identified match or correspondence. As another example, received customer identification (and/or customer account information) may be utilized to access customer device information associated with the customer. A customer device proxy or identifier may then be utilized to evaluate the accessed information and identify a desired customer device.

At block 355, communication may be established with the customer device 115. For example, communication may be established with an additional content application associated with the customer device 115, such as the additional content application 157 illustrated in FIG. 1. In certain embodiments, the service provider computers 105 may utilize, an accessed or received network address (e.g., an Internet Protocol ("IP") address, etc.) or other device identification information (e.g., a telephone number, etc.) to facilitate the establishment of communication with the customer device 115. In this regard, the service provider computers 105 may contact the customer device 115 and, as desired, invoke the additional content application 157. As desired, a first network may be utilized to invoke the additional content application 157, and a second network may be utilized to facilitate the establishment of a communications session between the additional content application 157 and the service provider computers 105. For example, based upon a telephone number, a cellular network may be utilized to communicate a request to the customer device 115 to invoke the additional content application 157. Once the additional content application is invoked, a service provider network or broadband network may be utilized to facilitate the establishment of a communications session between the additional content application 157 and the service provider computers 105.

Additionally, the customer premise device 110 from which the customer device identifying information was received may be identified. For example, a customer premise device identifier or network address may be identified. At block 360, a pairing between the customer premise device 110 and the customer device 115 may then be identified.

The method 340 may end following block 360.

In addition to or as an alternative to the pairing identification methods illustrated in FIGS. 3A-3C, other methods and/or techniques may be utilized as desired to identify a pairing between a customer premise device 110 and a customer device 115. The methods 300, 320, 340 are provided by way of example only.

Figure 4:
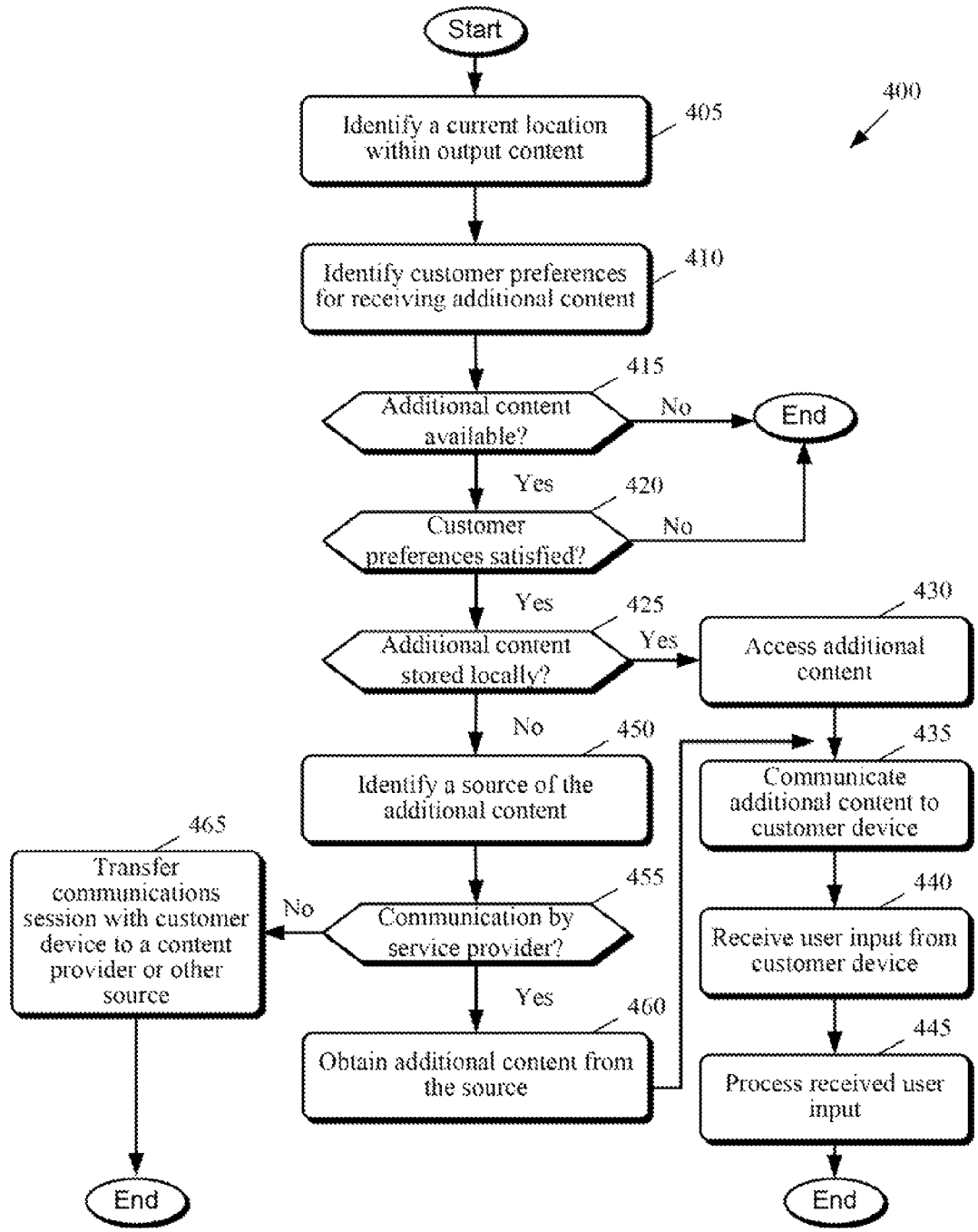
FIG. 4 is a flow diagram of one example method for identifying and facilitating the provision of additional information to a customer device, according to an example embodiment of the disclosure.

FIG. 4 is a flow diagram of one example method 400 for identifying and facilitating the provision of additional information to a customer device, according to an example embodiment of the disclosure. The method 400 may include one example of the operations that may be performed at blocks 220 and 225 illustrated in the method 200 of FIG. 2. As such, the operations of the method 400 may be performed by one or more suitable additional content applications associated with one or more service provider computers, such as the additional content applications 137 associated with the service provider computers 105 illustrated in FIG. 1. The method 400 may begin at block 405.

At block 405, a current location or point in time within content output by a customer premise device, such as the customer premise device 110 illustrated in FIG. 1, may be identified and/or determined. As explained in greater detail above with reference to block 215 of the method 200 illustrated in FIG. 2, a wide variety of suitable information (e.g., timing information, channel information, program information, etc.) may be utilized to identify a current location within output content.

At block 410, one or more customer preferences and/or parameters associated with the receipt of additional content may be identified. For example, preferences and/or parameters may be accessed from memory, received from a customer device 115, or received from another suitable data source. A wide variety of different types of customer preferences may be identified as desired in various embodiments, such as preferences associated with desired and/or approved types of available additional content, preferences associated with types of additional content that the customer does not wish to receive, and/or preferences associated with desired formatting of additional content. Additionally, in certain embodiments, one or more parameters associated with the customer device 115 may also be identified. For example, one or more parameters associated with input and/or output capabilities (e.g., types of available input devices, display capabilities, audio presentation capabilities, etc.) of the customer device 115 may be identified.

At block 415, a determination may be made as to whether additional content associated with the content output by the customer premise device 110 is available. For example, a determination may be made as to whether additional content associated with a current location within the output content is available either from memory or from any number of other sources, such as the content providers 130 illustrated in FIG. 1. If it is determined at block 415 that additional content is not available, then operations may end. If, however, it is determined at block 415 that additional content is available, then operations may continue at block 420.

At block 420, a determination may be made as to whether one or more customer preferences associated with receiving additional content are satisfied (and/or that one or more customer preferences associated with undesired additional content are not satisfied). For example, using the one or more customer preferences, a determination may be made as to whether the available additional content has been identified as desired content to be received or as undesired content. If it is determined at block 420 that one or more customer preferences have not been satisfied, then operations may end. If, however, it is determined at block 420 that the one or more customer preferences have been satisfied, then operations may continue at block 425.

At block 425, a determination may be made as to whether the identified additional content is stored locally by the service provider computers 105. If it is determined at block 425 that the additional content is stored locally, then operations may continue at block 430. At block 430, the additional content may be accessed from one or more local memory devices and/or content systems. The accessed additional content may then be communicated to the customer device 115 at block 435 via any number of suitable network connections. As desired in certain embodiments, user or customer input associated with the additional content (e.g., requests for other additional content, rating information, survey information, etc.) may be received from the customer device 115 at block 440. The received user input may then be processed by the service provider computers 105 at block 445 and, as desired, any number of suitable control actions may be taken based upon the processing. For example, other content may be communicated to the customer device 115, rating and/or survey information may be evaluated, or a communications session may be transferred to another entity (e.g., a content provider, etc.). Operations may then end following block 445.

At block 450, which may be reached from block 425 if it is determined that the additional content is not stored locally, then one or more sources of the additional content may be identified. For example, a content provider 130 or other content source may be identified. At block 455, a determination may be made as to whether the additional content should be communicated to the customer device 115 by the service provider. If it is determined at block 455 that the additional content should be communicated by the service provider, then operations may continue at block 460. At block 460, the service provider computers 105 may obtain the additional content from one or more suitable content sources. For example, the service provider computers 105 may communicate one or more requests for the additional content to one or more content sources, and the additional content may be received in response to the requests. Operations may then continue at block 435 described above, and the additional content may be communicated to the customer device 115.

If, however, it is determined at block 455 that the additional content is not content to be communicated by the service provider, then operations may continue at block 465. At block 465, a communications session with the customer device 115 may be transferred to a content source. Alternatively, contact information (e.g., a hyperlink, a network address, etc.) associated with the content source may be communicated to the customer device 115 to facilitate the establishment of a communications session between the content source and the customer device 115. In this regard, the content source may communicate the additional content to the customer device 115. Operations may then end following block 465.

The method 400 may end following either block 415, block 420, block 445, or block 465.

Figure 5:
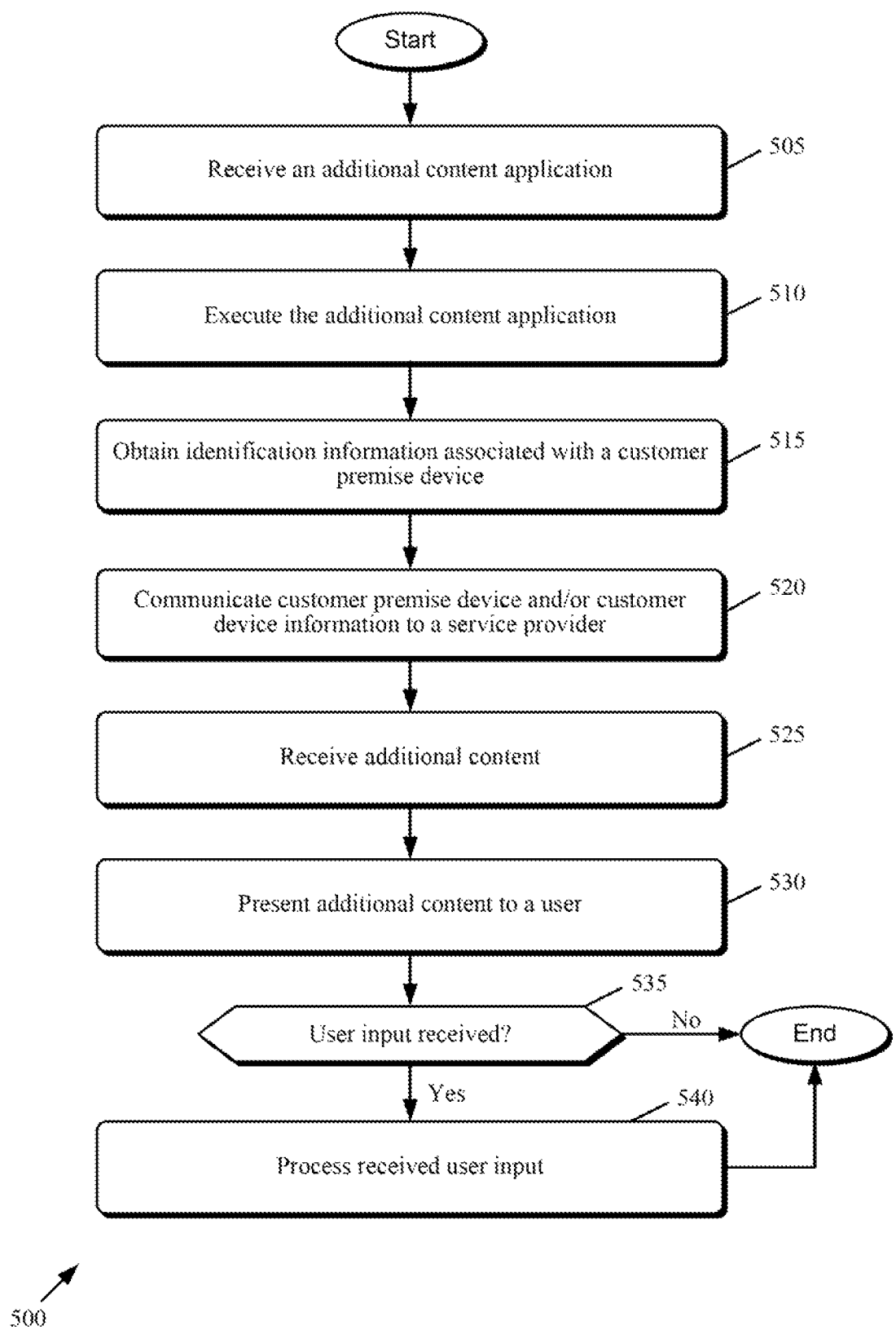
FIG. 5 is a flow diagram of one example method for receiving and processing additional content at a customer device, according to an example embodiment of the disclosure.

FIG. 5 is a flow diagram of one example method 500 for receiving and processing additional content at a customer device, according to an example embodiment of the disclosure. In certain embodiments, the operations of the method 500 may be performed by one or more suitable applications and/or modules associated with a customer device, such as the additional content application 157 associated with the customer device 115 illustrated in FIG. 1. The method 500 may begin at block 505.

At block 505, the additional content application 157 may be received by the customer device 115. The additional content application 157 may then be executed by the customer device 115 at block 510. A wide variety of suitable methods and/or techniques may be utilized to provide the additional content application 157 to the customer device 115. For example, the additional content application 157 may be downloaded by the customer device 115 from the service provider computers 105 or another source (e.g., an application store, etc.). As another example, a suitable over-the-air provisioning technique may be utilized to provide the additional content application 157 to the customer device 115. As yet another example, the additional content application 157 may be loaded onto the customer device 115 from a removable storage device, such as a flash drive, a thumb drive, or a CD-ROM.

At block 515, once the additional content application 157 is executed, the additional content application 157 may facilitate the identification and/or collection of information associated with a customer premise device, such as the customer premise device 110 illustrated in FIG. 1. A wide variety of suitable methods may be utilized as desired to identify a customer premise device 110. For example, a customer premise device 110 may be selected by the customer from a list of available customer premise devices. As another example, a code or identifier of the customer premise device 110 may be entered by the customer. As yet another example, communication may be established with the customer premise device 110, and customer premise device identification information may be received from the customer premise device 110.

At block 520, a wide variety of customer premise device and/or customer device information may be communicated to a service provider. For example, information may be communicated to the service provider computers 105 illustrated in FIG. 1. In certain embodiments, the customer device 115 may initiate communication with the service provider computers 105. In other embodiments, the service provider computers 105 may initiate communication with the customer device 115 and/or the additional content application 157. A wide variety of suitable customer premise device and/or customer device information may be communicated to the service provider computers 105 as desired in various embodiments, such as an identifier of the customer device 115 and/or an identifier of the customer premise device 110 (e.g., a device identifier, a code representative of the customer premise device 110, etc.). Additionally, in certain embodiments, customer preferences associated with additional content and/or information associated with the capabilities of the customer device 115 may be communicated to the service provider computers 105.

At block 525, additional content may be received from the service provider computers 105 and/or any number of other sources, such as the content providers 130 illustrated in FIG. 1. Once received, the additional content may be processed by the additional content application 157, and at least a portion of the additional content may be presented or otherwise output to a user or customer at block 530. In certain embodiments, the additional content application 157 may receive formatting and/or display information in association with the additional content, and the additional content application 157 may generate one or more suitable displays based at least in part upon the formatting and/or display information. Additionally, in certain embodiments, the additional content application 157 may operate in a "sandbox" mode that is capable of receiving, processing, and/or presenting a wide variety of different types of additional content and/or combinations of additional content types.

At block 535, a determination may be made as to whether user input has been received by the customer device 115 and/or the additional content application 157. A wide variety of different types of user input may be received as desired in various embodiments, such as requests for other content (e.g., other additional content), survey responses, rating information, and/or purchase requests. If it is determined at block 535 that no user input has been received, then operations may end. If, however, it is determined at block 535 that user input has been received, then operations may continue at block 540. At block 540, the received user input may be processed by the additional content application 157 and, as desired, a wide variety of suitable actions may be taken based at least in part upon the received user input. For example, received user input may be communicated to the service provider computer 105 (or another source of additional content). As another example, other additional content may be requested by the additional content application 157. Indeed, a wide variety of suitable processing may be performed by the additional content application 157 in response to received user input. Operations may then end following block 540.

The method 500 may end following either block 535 or block 540.

The operations described and shown in the methods 200, 300, 400, 500 of FIGS. 2-5 may be carried out or performed in any suitable order as desired in various embodiments of the invention. Additionally, in certain embodiments, at least a portion of the operations may be carried out in parallel. Furthermore, in certain embodiments, less than or more than the operations described in FIGS. 2-5 may be performed.

Various block and/or flow diagrams of systems, methods, apparatus, and/or computer program products according to example embodiments of the disclosure are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a special purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special purpose, hardware-based computer systems that perform the specified functions, elements or steps, or combinations of special purpose hardware and computer instructions.

Many modifications and other embodiments of the disclosure set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
communicating, by a service provider system comprising one or more computers, a code to a customer premise device configured to output the code to a customer device;
receiving, by the service provider system, the code from the customer device;
identifying, by the service provider system, a pairing between the customer premise device and a customer device, based on the code received from the customer device;
establishing a communication session between the customer premise device and the customer device based at least in part on the identified pairing;
receiving, by the service provider system from the customer premise device, information associated with a first content output by the customer premise device, wherein the first content is within broadband content;
evaluating the received information to determine the first content being output by the customer premise device, wherein the first content includes one or more content objects;
determining, by the service provider system, a current location of the first content within the broadband content, wherein the current location includes timing information associated with the first content;
identifying, by the service provider system based at least in part upon the evaluation of the received information and the current location within the broadband content, additional content associated with at least one of the one or more content objects in the first content, to be communicated to the customer device; and
facilitating, by the service provider system, communication of the additional content to the customer device for presentment with the broadband content based at least in part on the pairing between the customer premise device and the customer device.

2. The method of claim 1, wherein the customer premise device comprises one of (i) a set-top box, (ii) an embedded set-top box, or (iii) a virtual set-top box, and
wherein the customer device comprises one of (i) a mobile device, (ii) a tablet computer, or (iii) a personal computer.

3. The method of claim 1, further comprising:
establishing, by the service provider system in association with the identified pairing, communication with an additional content application executed by the customer device,
wherein the additional content application is configured to present the additional content.

4. The method of claim 1, wherein receiving information associated with the first content output by the customer premise device comprises receiving at least one of (i) an identifier of a channel associated with the first content, (ii) and a program identifier associated with the first content.

5. The method of claim 1, wherein identifying additional content comprises:
determining, based upon the evaluation of the received information, a current location associated with at least one of the one or more content objects within the first content output by the customer premise device; and
identifying the additional content based at least in part upon the determined current location.

6. The method of claim 1, wherein identifying additional information comprises identifying supplemental information associated with the first content output by the customer premise device.

7. The method of claim 1, wherein facilitating communication of the additional content to the customer device comprises one of (i) communicating, by the service provider system, the additional content to the customer device or (ii) facilitating, by the service provider system, the establishment of a communications session between the customer device and a content provider configured to communicate the additional content to the customer device.

8. The method of claim 1, further comprising:
obtaining, by the service provider system from at least one content provider, the additional content,
wherein facilitating communication of the additional content to the customer device comprises communicating the obtained additional content to the customer device.

9. A system, comprising:
at least one memory operable to store computer-executable instructions; and
at least one processor configured to access the at least one memory and execute the computer-executable instructions to:
communicate a code to a customer premise device configured to output the code to a customer device;

receive the code from the customer device;

identify a pairing between the customer premise device and the customer device, based at least in part on evaluating the code received from the customer device;

establish a communication session between the customer premise device and the customer device based at least in part on the identified pairing;

receive, from the customer premise device, information associated with a first content output by the customer premise device, wherein the first content is within broadband content;

evaluate the received information to determine the first content being output by the customer premise device, wherein the first content includes one or more content objects;

determine a current location of the first content within the broadband content, wherein the current location includes timing information associated with the first content;

identify, based at least in part upon the evaluation of the received information and the current location, additional content associated with at least one of the one or more content objects in the first content, to be communicated to the customer device; and facilitate communication of the additional content to the customer device for presentment with the broadband content based at least in part on the pairing between the customer premise device and the customer device.

10. The system of claim 9, wherein the customer premise device comprises one of (i) a set-top box, (ii) an embedded set-top box, or (iii) a virtual set-top box, and wherein the customer device comprises one of (i) a mobile device, (ii) a tablet computer, or (iii) a personal computer.

11. The system of claim 9, wherein the at least one processor is further configured to execute the computer-executable instructions to:

establish, in association with the identified pairing, communication with an additional content application executed by the customer device, wherein the additional content application is configured to present the additional content.

12. The system of claim 9, wherein the received information associated with the first content output by the customer premise device comprises at least one of (i) an identifier of a channel associated with the first content, and (ii) a program identifier associated with the first content.

13. The system of claim 9, wherein the at least one processor is configured to identify the additional content by executing the computer-executable instructions to:

determine, based upon the evaluation of the received information, a current location associated with at least one of the one or more content objects within the first content output by the customer premise device; and identify the additional content based at least in part upon the determined current location.

14. The system of claim 9, wherein the additional information comprises supplemental information associated with the first content output by the customer premise device.

15. The system of claim 9, wherein the at least one processor is configured to facilitate communication of the additional content to the customer device by executing the computer-executable instructions to (i) direct communication of the additional content to the customer device or (ii) facilitate the establishment of a communications session between the customer device and a content provider configured to communicate the additional content to the customer device.

16. The system of claim 9, wherein the at least one processor is further configured to execute the computer-executable instructions to:

obtain, from at least one content provider, the additional content; and direct communication of the obtained additional content to the customer device.

\* \* \* \* \*